United States Patent
Hirama et al.

(10) Patent No.: US 9,641,506 B2
(45) Date of Patent: May 2, 2017

(54) INFORMATION PROCESSING METHOD, INFORMATION PROCESSING DEVICE, AUTHENTICATION SERVER DEVICE, AND VERIFICATION SERVER DEVICE CAPABLE OF IMPOSING USE RESTRICTION

(71) Applicant: FeliCa Networks, Inc., Tokyo (JP)

(72) Inventors: Hiroyuki Hirama, Kanagawa (JP); Satoru Nakagawa, Kanagawa (JP)

(73) Assignee: FeliCa Networks, Inc., Tokyo (JP)

( * ) Notice: Subject to any disclaimer, the term of this patent is extended or adjusted under 35 U.S.C. 154(b) by 69 days.

(21) Appl. No.: 14/660,185

(22) Filed: Mar. 17, 2015

(65) Prior Publication Data

US 2015/0281202 A1 Oct. 1, 2015

(30) Foreign Application Priority Data

Mar. 31, 2014 (JP) .................................. 2014-071701

(51) Int. Cl.
*H04L 29/06* (2006.01)
*H04W 4/00* (2009.01)
*H04W 12/06* (2009.01)
*H04B 5/00* (2006.01)

(52) U.S. Cl.
CPC .......... *H04L 63/08* (2013.01); *H04L 63/0492* (2013.01); *H04W 4/008* (2013.01); *H04W 12/06* (2013.01); *H04B 5/0056* (2013.01)

(58) Field of Classification Search
CPC ... H04L 63/08; H04L 63/0492; H04B 5/0056; G06K 7/10366; G06F 21/62; G06F 21/44; G06F 2221/2129
See application file for complete search history.

(56) References Cited

U.S. PATENT DOCUMENTS

| | | | | |
|---|---|---|---|---|
| 2003/0196119 A1* | 10/2003 | Raley | ..................... | G06F 21/10 726/7 |
| 2007/0067851 A1* | 3/2007 | Fernando | ................ | G06F 21/10 726/26 |
| 2008/0051986 A1* | 2/2008 | Amano | .................. | G01C 21/00 701/400 |
| 2008/0235805 A1* | 9/2008 | Pfitzmann | ............... | G06F 21/10 726/27 |
| 2008/0279373 A1* | 11/2008 | Erhart | ..................... | H04L 9/302 380/46 |
| 2009/0204806 A1* | 8/2009 | Kanemura | .............. | G06F 21/10 713/155 |
| 2010/0125881 A1* | 5/2010 | Douma | .................. | H04N 7/173 725/87 |

(Continued)

*Primary Examiner* — Don Zhao
(74) *Attorney, Agent, or Firm* — Paratus Law Group, PLLC

(57) ABSTRACT

There is provided an information processing method of an information processing device, including acquiring tag-unique information unique to an IC tag from the IC tag through near field communication, acquiring device-unique information unique to the information processing device, transmitting the acquired tag-unique information and the acquired device-unique information to an outside, and receiving, from the outside, an authentication result of the acquired tag-unique information and a verification result of right information for using the IC tag, which are obtained based on the transmitted tag-unique information and device-unique information.

16 Claims, 11 Drawing Sheets

(56) References Cited

U.S. PATENT DOCUMENTS

| | | | |
|---|---|---|---|
| 2010/0189265 A1* | 7/2010 | Ito | H04L 9/0822 380/285 |
| 2012/0079606 A1* | 3/2012 | Evans | G06F 21/10 726/28 |
| 2012/0189281 A1* | 7/2012 | Nakano | H04N 21/2541 386/252 |
| 2013/0347018 A1* | 12/2013 | Limp | H04N 21/4826 725/19 |

* cited by examiner

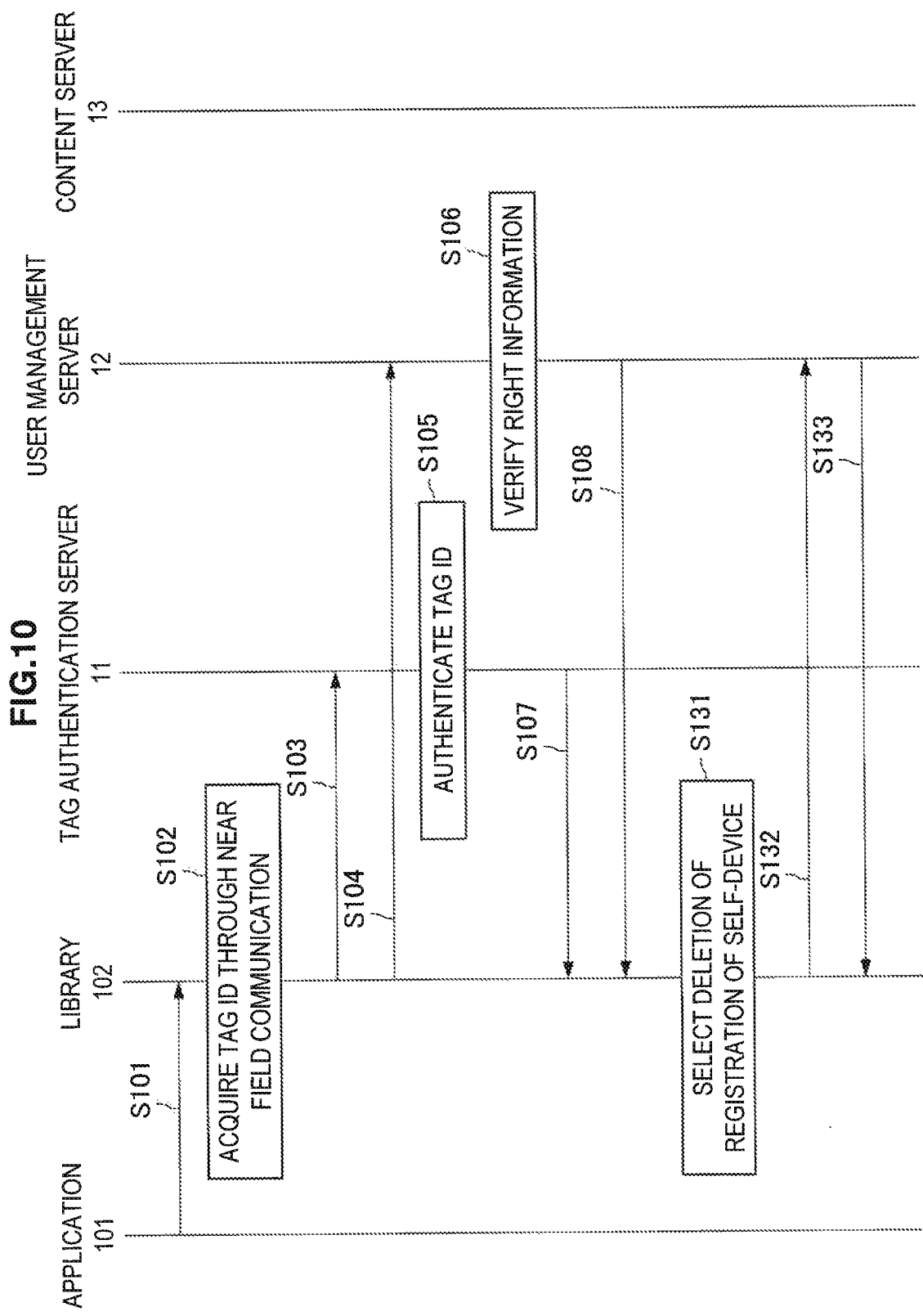

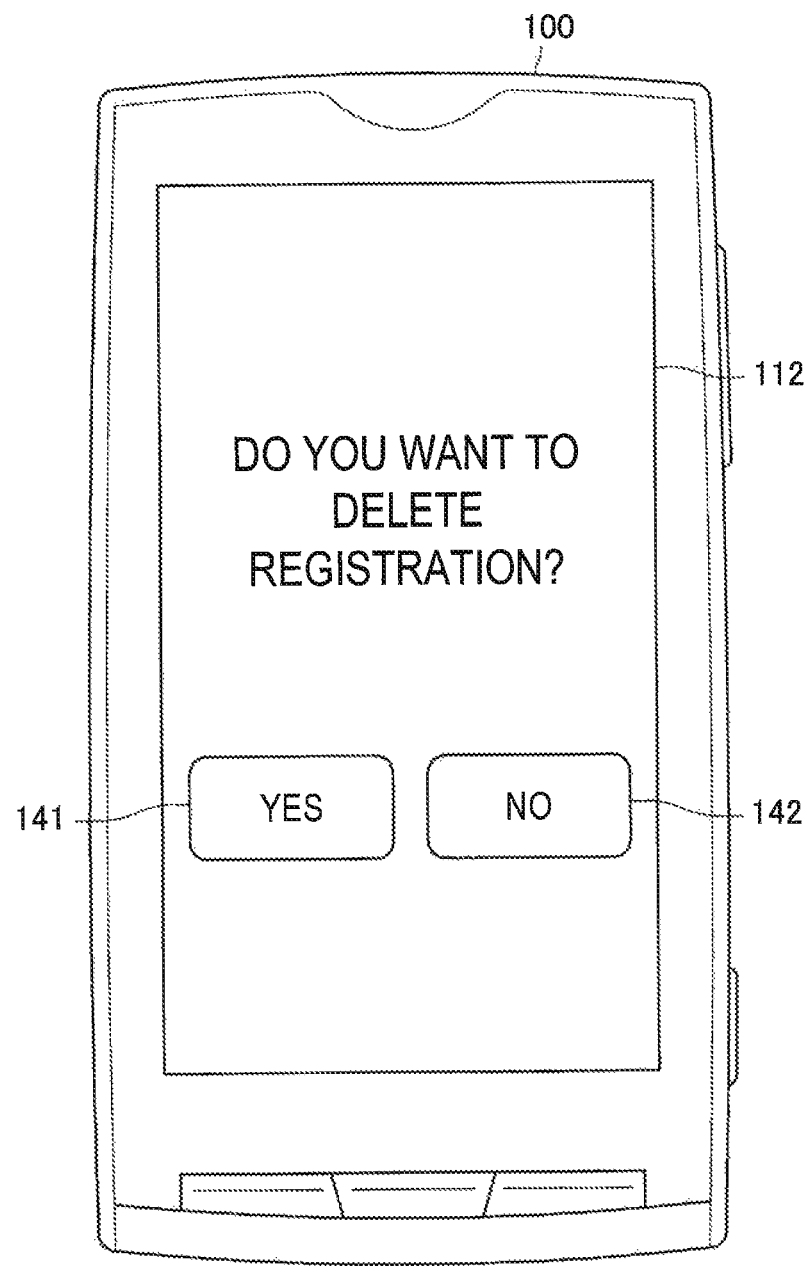

INFORMATION PROCESSING METHOD, INFORMATION PROCESSING DEVICE, AUTHENTICATION SERVER DEVICE, AND VERIFICATION SERVER DEVICE CAPABLE OF IMPOSING USE RESTRICTION

CROSS REFERENCE TO RELATED APPLICATIONS

This application claims the benefit of Japanese Priority Patent Application JP 2014-071701 filed Mar. 31, 2014, the entire contents of which are incorporated herein by reference.

BACKGROUND

The present disclosure relates to an information processing method, an information processing device, an authentication server device, and a verification server device.

In recent years, systems that use the technology of near field communication using cards in which IC chips (IC cards) are embedded to enable use of automatic ticket checkers at stations, payment of product prices at stores with electronic money, and the like have become widespread. The near field communication is communication that can be performed by devices when they come within about, for example, 10 centimeters from each other. In such a system, when an IC card is held over a reader-writer, use of an automatic ticket checker at a station, payment of a product price at a store using electronic money, and the like are possible. Further, systems that enable use of automatic ticket checkers, payment of product prices, and the like in the same manner by embedding such an IC chip in a mobile telephone and holding the mobile telephone over a reader-writer have also become widespread.

In recent years, there are systems that execute any program stored in portable terminals by holding devices in which IC chips are embedded over reader-writers. For example, there are systems that provide coupons available in stores to devices by holding the devices in which IC chips are embedded over reader-writers installed in the stores (see, for example, JP 2005-122491A).

SUMMARY

By using such technologies for near field communication, it is also possible to construct, for example, systems that deliver digital content such as music or images to portable terminals using the near field communication as a trigger. In general, digital content is provided with a structure for copyright protection, and thus restriction is imposed on the number of reproductions, the number of copies, or the like. Accordingly, when digital content is output to a portable terminal using near field communication executed between the portable terminal and an IC tag in which an IC chip is embedded as a trigger, use restriction of the digital content is preferably configured to be imposed simply and flexibly.

It is desirable to provide a novel and improved information processing method, a novel and improved information processing device, a novel and improved authentication server device, and a novel and improved verification server device capable of imposing use restriction of digital content simply and flexibly by using an authentication process by near field communication.

According to an embodiment of the present disclosure, there is provided an information processing method of an information processing device, including acquiring tag-unique information unique to an IC tag from the IC tag through near field communication, acquiring device-unique information unique to the information processing device, transmitting the acquired tag-unique information and the acquired device-unique information to a server device, and receiving, from the server device, an authentication result of the acquired tag-unique information and a verification result of right information for using the IC tag, which are obtained in the server device based on the transmitted tag-unique information and device-unique information.

According to another embodiment of the present disclosure, there is provided an information processing device including a near field communication instruction unit configured to acquire tag-unique information unique to an IC tag from the IC tag through near field communication, a device-unique information acquisition instruction unit configured to acquire device-unique information unique to the information processing device, a transmission unit configured to transmit the acquired tag-unique information and the acquired device-unique information to a server device, and a reception unit configured to receive, from the server device, an authentication result of the acquired tag-unique information and a verification result of right information for using the IC tag, which are obtained in the server device based on the tag-unique information and the device-unique information.

According to still another embodiment of the present disclosure, there is provided an authentication server device that authenticates tag-unique information in a system in which the tag-unique information unique to an IC tag and device-unique information unique to an information processing device are acquired from the information processing device, an authentication result of the tag-unique information and a verification result of right information for using the IC tag are transmitted to the information processing device, and the information processing device executes a process related to the tag-unique information based on the authentication result and the verification result, the authentication server device including a communication unit configured to communicate with the information processing device, and an authentication processing unit configured to receive the tag-unique information from the information processing device via the communication unit, to execute an authentication process based on the tag-unique information, and to transmit the authentication result of the tag-unique information to the information processing device.

According to yet another embodiment of the present disclosure, there is provided a verification server device that verifies right information in a system in which tag-unique information unique to an IC tag and device-unique information unique to an information processing device are acquired from the information processing device, an authentication result of the tag-unique information and a verification result of the right information for using the IC tag are transmitted to the information processing device, and the information processing device executes a process related to the tag-unique information based on the authentication result and the verification result, the verification server device including a communication unit configured to communicate with the information processing device, and a verification processing unit configured to receive the tag-unique information and the device-unique information from the information processing device via the communication unit, to perform a verification process for the right information based on the tag-unique information and the device-unique information, and to transmit the verification result of the right information to the information processing device.

According to embodiments of the present disclosure described above, it is possible to provide a novel and improved information processing method, a novel and improved authentication server device, and a novel and improved verification server device capable of imposing use restriction of digital content simply and flexibly by using an authentication process by near field communication.

Note that the effects described above are not necessarily limited, and along with or instead of the effects, any effect that is desired to be introduced in the present specification or other effects that can be expected from the present specification may be exhibited.

BRIEF DESCRIPTION OF THE DRAWINGS

FIG. 10 is a flowchart showing an operation example of the information processing system according to an embodiment of the present disclosure; and FIG. 11 is an illustrative diagram showing an example of a screen output to the display unit by the portable terminal according to an embodiment of the present disclosure.

DETAILED DESCRIPTION OF THE EMBODIMENTS

Figure 1:
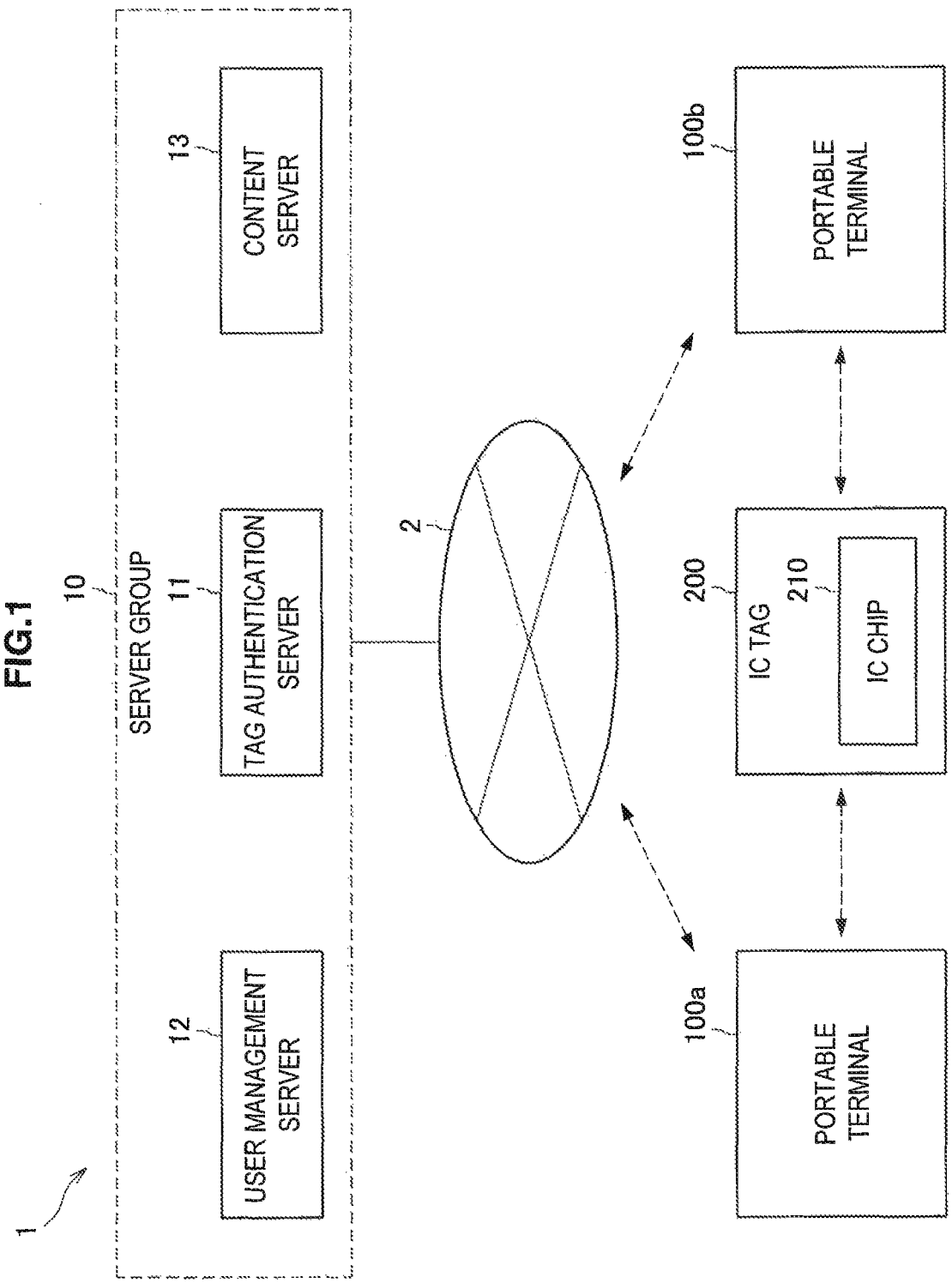
FIG. 1 is an illustrative diagram showing a configuration example of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.

1. Embodiment of the present disclosure
1.1. System configuration example
1.2 Functional configuration example
1.3 System operation example
1.4 Other modification examples 2. Conclusion <1. An Embodiment Of The Present Disclosure>

[1.1. System Configuration Example]

First, a configuration example of an information processing system according to an embodiment of the present disclosure will be described with reference to an accompanying drawing. FIG. 1 is an illustrative diagram showing the configuration example of the information processing system 1 according to the embodiment of the present disclosure. Hereinbelow, the configuration example of the information processing system 1 according to the embodiment of the present disclosure will be described using FIG. 1.

As shown in FIG. 1, the information processing system 1 according to the embodiment of the present disclosure includes a server group 10, portable terminals 100a and 100b (when it is not necessary to distinguish the portable terminals 100a and 100b from each other, the portable terminals 100a and 100b are simply referred to as the portable terminals 100 in some cases), and an IC tag 200. The server group 10 and the portable terminals 100 are connected to a network 2 such as the Internet.

The server group 10 is configured by servers that manage data used by the information processing system 1 according to the embodiment. In the embodiment, the server group 10 includes a tag authentication server 11, a user management server 12, and a content server 13. The tag authentication server 11 is a server that authenticates legitimacy of the IC tag 200 when the portable terminal 100 is held over the IC tag 200. Accordingly, the tag authentication server 11 retains authentication information for authenticating the legitimacy of the IC tag 200. The authentication information retained by the tag authentication server 11 is, for example, a master key for authenticating a session random number provided to the portable terminal 100 or information and a session random number retained by the IC tag 200.

The tag authentication server 11 is an example of an authentication server device according to an embodiment of the present disclosure and retains tag-unique information (for example, a tag ID uniquely granted from an issuer of the IC tag 200) unique to the IC tag 200 available in a service, key information for authenticating the IC tag 200, and parameters or statuses of the service for each service provided by the content server 13. The parameters of the service can include information on the location of the content server 13 providing a service corresponding to the IC tag 200. Examples of the statuses of the service can include a valid period of the IC tag 200, a valid period of the service corresponding to the IC tag 200, the number of times digital content provided by the content server 13 can be used, and various kinds of information on the providing of the service corresponding to the IC tag 200. That is, the tag authentication server 11 can have a function of communicating with the portable terminals 100a and 100b and a function of executing an authentication process based on tag IDs sent from the portable terminals 100a and 100b and transmitting authentication results of the tag IDs to the portable terminals 100a and 100b.

The user management server 12 is an example of a verification server device according to the embodiment of the present disclosure and manages information on a user using the information processing system 1 according to an embodiment of the present disclosure. When a user desires to use a service provided by the content server 13, information on the portable terminal 100 of the user is registered in the user management server 12. Examples of the information on the user managed by the user management server 12 can include a user ID used to uniquely identify a user using digital content provided by the content server 13, a model name of the portable terminal 100 used by the user, and a device ID used to uniquely identify the portable terminal 100 used by the user. Examples of the information on the user managed by the user management server 12 can also include information on a time at which the user holds the portable terminal 100 over the IC tag 200. The information on the user managed by the user management server 12 is used for the content server 13 to provide content.

The content server 13 is a server that manages digital content and delivers the managed digital content in response to requests from the portable terminals 100. The digital content is assumed to refer to information such as a still image, a moving image (which may have a download format or a streaming format), music (which may have a download format or a streaming format), and an electronic book configured of digital data. In the embodiment, the content server 13 provides digital content corresponding to the IC tag 200 to the portable terminal 100 when the portable terminal 100 is held over the IC tag 200.

The portable terminal 100 is configured by, for example, a mobile phone, a high-performance mobile phone (smartphone), a tablet terminal, or a personal computer and is a terminal that has a function of reading information from the IC tag 200 by near field communication (NFC). Accordingly, the portable terminal 100 includes an IC chip capable of executing near field communication.

The IC tag 200 is a tag that encloses an IC chip 210 capable of executing near field communication therein. The form of the IC tag 200 can be, for example, a sheet coated with vinyl or a plastic. When the portable terminal 100 is held over the IC tag 200 and the IC tag 200 receives radio waves from the portable terminal 100, the IC tag 200 transmits information to the portable terminal 100 through near field communication. The near field communication executed between the portable terminal 100 and the IC tag 200 is communication executed at a frequency of, for example, 13.56 MHz.

In the information processing system 1 having the configuration illustrated in FIG. 1, for example, the following event can occur. The information processing system 1 having the configuration illustrated in FIG. 1 preferably handles the following event.

When digital content such as an image or music is output with the portable terminal 100 using, as a trigger, the fact that the portable terminal 100 including the IC chip capable of executing near field communication is held over the IC tag 200 including the IC chip 210 capable of executing the same near field communication and the IC tag 200 is used a plurality of times with the plurality of portable terminals 100, the digital content may be accordingly used without limit. The unlimited use of the digital content may cause the copyright owner to be hesitant about distributing the digital content.

Accordingly, in the embodiment, the portable terminal 100 acquires information (tag ID) unique to the IC tag 200 from the IC tag 200 through the near field communication and receives authentication of the tag ID from the tag authentication server 11 by transmitting the tag ID to the tag authentication server 11. Further, the portable terminal 100 receives a verification regarding whether the portable terminal 100 has right information on a right to use the IC tag 200 (in other words, a right to use the tag ID acquired from the IC tag 200 through the near field communication) from the user management server 12. When the portable terminal 100 receives authentication of the tag ID from the tag authentication server 11 and receives the verification regarding whether the portable terminal 100 has the right information from the user management server 12 and, consequently, the IC tag 200 is legitimate and the portable terminal 100 has the right to use the IC tag 200, the portable terminal 100 can acquire the digital content corresponding to the IC tag 200 from the content server 13. That is, the user management server 12 can have a function of communicating with the portable terminals 100a and 100b and a function of executing a verification process on the right information based on the tag IDs and the device IDs sent from the portable terminals 100a and 100b and transmitting the verification results of the right information to the portable terminals 100a and 100b.

When the portable terminal 100 receives the verification of the right information by the user management server 12 in addition to the authentication by the tag authentication server 11, the information processing system 1 according to the embodiment can prevent the digital content corresponding to the IC tag 200 from being used without limit.

Specifically, the tag authentication server 11 manages the number of accesses to the IC tag 200 for each portable terminal 100. The access refers to acquisition of the tag ID by the portable terminal 100 through the near field communication between the portable terminal 100 and the IC tag 200. The tag authentication server 11 manages the number of portable terminals 100 unique to each IC tag 200. For example, the tag authentication server 11 manages the number of portable terminals 100 unique to each IC tag 200 so that, for example, up to five portable terminals 100 can be used for each IC tag 200. The tag authentication server 11 manages the tag ID unique to each portable terminal 100. When the tag authentication server 11 manages such information, the information processing system 1 according to the embodiment of the present disclosure can prevent the digital content corresponding to the IC tag 200 from being used without limit.

The user management server 12 manages the user IDs for uniquely identifying users using the digital content and the device IDs for uniquely identifying the portable terminals 100 used by the users in association therewith. The information processing system 1 according to the embodiment of the present disclosure can impose the restriction on the number of portable terminals 100 using the digital content based on the association of the user IDs and the device IDs when the digital content is used with the plurality of portable terminals 100 by the same users.

The specific example of the information processing system 1 according to the embodiment of the present disclosure has been described above. Next, a functional configuration example of the portable terminal 100 according to the embodiment of the present disclosure will be described.

[1.2 Functional Configuration Example of Terminal Device]

Figure 2:
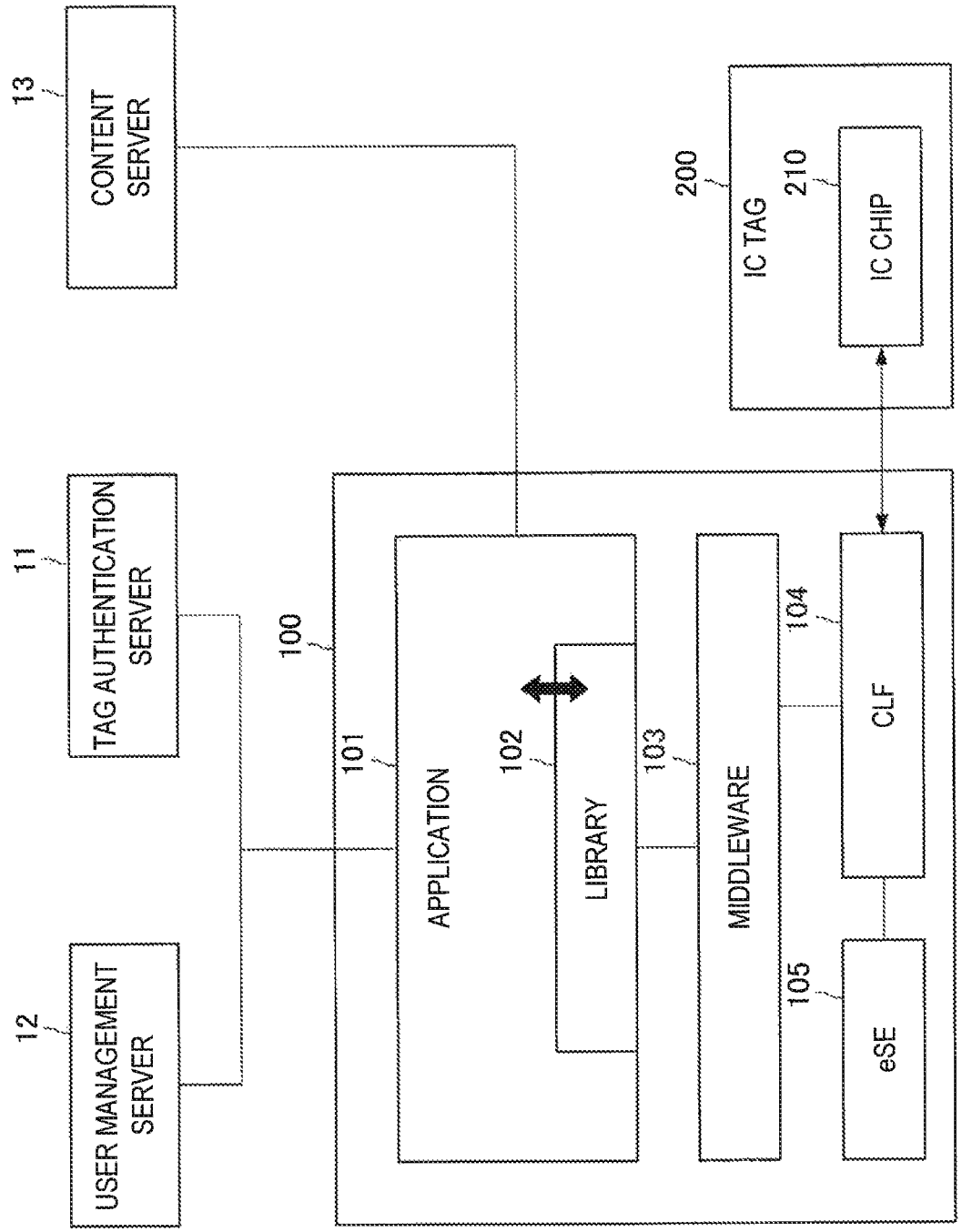
FIG. 2 is an illustrative diagram showing a functional configuration example of a portable terminal according to an embodiment of the present disclosure.

FIG. 2 is an illustrative diagram showing a functional configuration example of the portable terminal 100 according to an embodiment of the present disclosure. In FIG. 2, the tag authentication server 11, the user management server 12, the content server 13, and the IC tag 200 are illustrated together for the purpose of description. Hereinafter, the functional configuration example of the portable terminal 100 according to the embodiment of the present disclosure will be described with reference to FIG. 2.

The portable terminal 100 according to the embodiment of the present disclosure executes an application 101 to receive the digital content from the content server 13 and outputs the digital content. The application 101 is executed by the portable terminal 100, for example, according to a predetermined manipulation on the portable terminal 100 by the user of the portable terminal 100. The application 101 calls a library 102 acquiring various kinds of information from the inside of the portable terminal 100 or the IC tag 200 or transmitting and receiving information to and from the tag authentication server 11 and user management server 12. The portable terminal 100 according to the embodiment of the present disclosure includes middleware 103 that controls the near field communication by a contactless front-end (CLF) 104, the CLF 104 that executes the near field communication, and an embedded secure element (eSE) 105 that retains device-unique information (device ID).

The application 101 that receives the digital content from the content server 13 and outputs the digital content can be, for example, a program operated by a web browser operating on an operating system (OS) of the portable terminal 100 or a dedicated program that outputs the digital content. Accordingly, the application 101 can function as an example of a process execution unit according to an embodiment of the present disclosure. The application 101 is activated according to a manipulation on the portable terminal 100 of the user.

The library 102 called from the application 101 has a function of acquiring various kinds of information or transmitting and receiving information to and from the tag authentication server 11 and the user management server 12, as described above. Specifically, the library 102 sends an instruction to acquire the tag ID from the IC tag 200 to the middleware 103 or sends an instruction to acquire the device-unique information (device ID) from the eSE 105 to be described below to the middleware 103. The library 102 has a function of transmitting the acquired information to the tag authentication server 11 and the user management server 12 and receiving information from the tag authentication server 11 and the user management server 12. The library 102 delivers a result obtained by verifying whether the held IC tag 200 can be used based on the information received from the tag authentication server 11 and the user management server 12 to the application 101. The application 101 makes a request for providing the digital content corresponding to the held IC tag 200 to the content server 13 when the result acquired from the library 102 is contents indicating that the IC tag 200 can be used.

Figure 3:
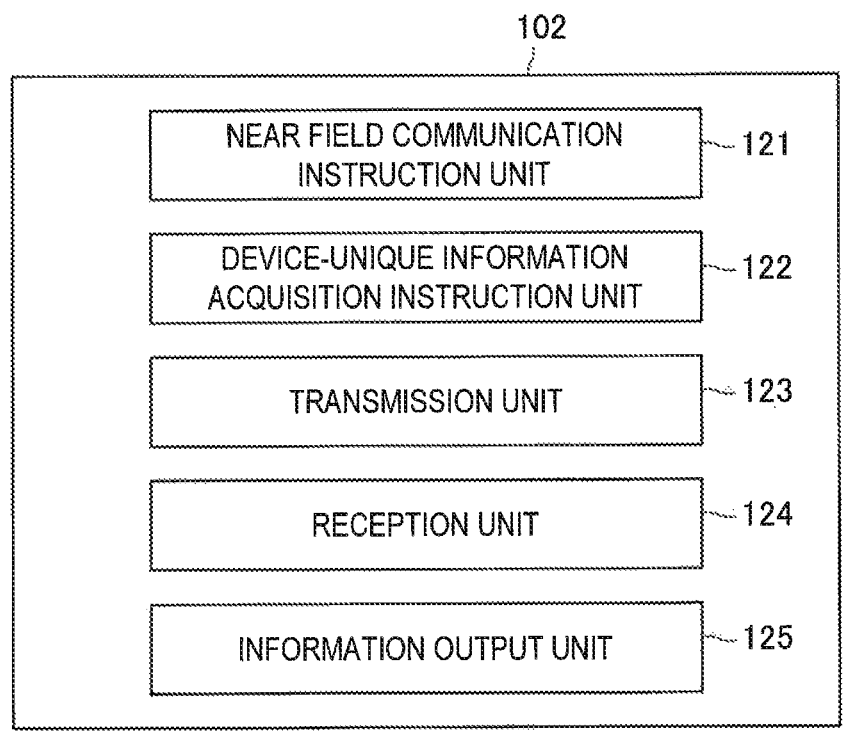
FIG. 3 is an illustrative diagram showing a functional configuration example of a library.

To execute the series of processes described above, the library 102 can have, for example, a configuration illustrated in FIG. 3. In an example illustrated in FIG. 3, the library 102 is configured to include a near field communication instruction unit 121, a device-unique information acquisition instruction unit 122, a transmission unit 123, a reception unit 124, and an information output unit 125.

The near field communication instruction unit 121 sends an instruction to acquire the tag ID from the IC tag 200 through the near field communication to the middleware 103. The device-unique information acquisition instruction unit 122 sends an instruction to acquire the device ID which is an example of the device-unique information from the eSE 105 to the middleware 103. The transmission unit 123 transmits the acquired tag ID or device ID to the tag authentication server 11 and the user management server 12. The reception unit 124 receives an authentication result of the tag ID in the tag authentication server 11 or a verification result of the right information in the user management server 12. Then, the information output unit 125 outputs a result obtained by verifying whether the held IC tag 200 can be used to the application 101. The information output unit 125 outputs various kinds of information to a screen (for example, a display unit 112 to be described below) of the portable terminal 100. As the information output to the screen of the portable terminal 100 by the information output unit 125, for example, there is information on another portable terminal 100 that has the right information on the tag ID which the held IC tag 200 has, as will be described below.

The library 102 has a role of executing a series of processes in which the portable terminal 100 is held over the IC tag 200 and the result obtained by verifying whether the IC tag 200 can be used is then delivered to the application 101. When the library 102 has the role of executing the series of processes, the application 101 can be simply mounted. That is, when the processes with the tag authentication server 11 and the user management server 12 are entrusted to the library 102, the application 101 can execute a process of outputting the digital content provided from the content server 13 regardless of not only the presence of the tag authentication server 11 and the user management server 12 but also the communication with the tag authentication server 11 and the user management server 12

When the library 102 executes the series of processes with the tag authentication server 11 to first authenticate the legitimacy of the IC tag 200, interfaces with the tag authentication server 11 and the content server 13 are not necessary either. That is, in the information processing system 1 according to the embodiment, the legitimacy of the IC tag 200 can be first authenticated to verify the legitimacy of the IC tag 200 and the access to the content server 13 may be executed for the first time. Therefore, it is also easy to construct the entire information processing system 1.

The middleware 103 controls the near field communication by the CLF 104. The middleware 103 is software that operates on the portable terminal 100 while the portable terminal 100 is activated. The middleware 103 causes the CLF 104 to execute the near field communication with the IC tag 200 based on an instruction from the library 102. The middleware 103 acquires the device ID from the eSE 105 based on an instruction from the library 102.

The CLF 104 executes the near field communication under the control of the middleware 103. In the embodiment, the CLF 104 executes the near field communication with the IC tag 200 under the control of the middleware 103 to receive the tag ID from the IC chip 210 of the IC tag 200. When the CLF 104 receives the tag ID from the IC chip 210, the CLF 104 may acquire information for determining whether the tag ID is a regular ID. The information for determining whether the tag ID is the regular ID may be, for example, information encrypted with a key stored in the IC chip 210.

The eSE 105 is a secure element that is embedded into the portable terminal 100. The secure element refers to a secure region that is designed to resist an analysis attack (a malicious attack, for example) from the outside, includes a memory safely storing data, an encryption processing circuit, or the like, and corresponds to an encryption function, a key management function, or the like when the near field communication is executed. In the embodiment, the device ID is included in the eSE 105 and the middleware 103 reads the device ID from the eSE 105 based on an instruction from the library 102.

In the embodiment, the tag authentication server 11 and the user management server 12 are illustrated separately as different servers, but an embodiment of the present disclosure is not limited to the relevant examples. The tag authentication server 11 and the user management server 12 may be the same server. None of the tag authentication server 11, the user management server 12, and the content server 13 described above is limited to a single server, but each may be configured by a plurality of clustered servers.

Figure 4:
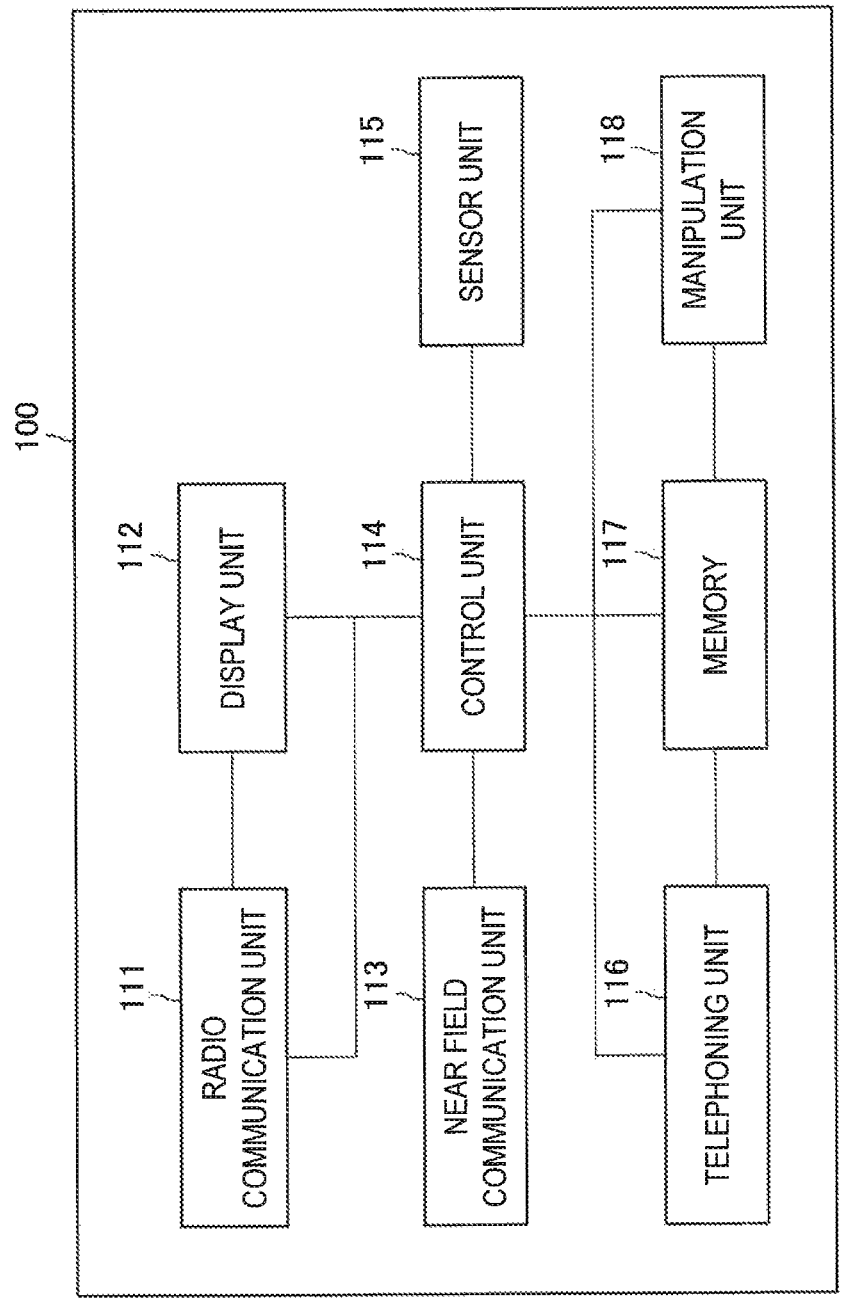
FIG. 4 is an illustrative diagram showing a configuration example of the portable terminal according to an embodiment of the present disclosure.

Next, a specific configuration example of the portable terminal 100 will be described. FIG. 4 is an illustrative diagram showing the configuration example of the portable terminal 100 according to the embodiment of the present disclosure. Hereinafter, the configuration example of the portable terminal 100 according to the embodiment of the present disclosure will be described with reference to FIG. 4.

As illustrated in FIG. 4, the portable terminal 100 according to the embodiment of the present disclosure includes a radio communication unit 111, a display unit 112, a near field communication unit 113, a control unit 114, a sensor unit 115, a telephoning unit 116, a memory 117, and a manipulation unit 118.

The radio communication unit 111 executes radio communication with another device (for example, the tag authentication server 11, the user management server 12, or the content server 13) via a radio network. The display unit 112 displays information received by the radio communication unit 111 or information according to a user's manipulation executed on the manipulation unit 118. The display unit 112 is configured by, for example, a flat type image display panel such as a liquid crystal display or an organic EL display. In the portable terminal 100 according to the embodiment of the present disclosure, a touch panel may be installed in the display unit 112.

The near field communication unit 113 executes the near field communication with the IC tag 200 to transmit and receive information to and from the IC tag 200. The near field communication unit 113 is configured by, for example, the CLF 104 illustrated in FIG. 2, and transmits and receives information to and from the IC tag 200 by emitting predetermined radio waves and causing the IC tag 200 to generate an electromotive force. The control unit 114 controls an operation of the portable terminal 100. For example, the control unit 114 controls the operation of the portable terminal 100 by executing a program stored in the memory 117. By the control of the operation of the portable terminal 100 by the control unit 114, for example, the application 101 is executed to output the digital content according to the IC tag 200 through the communication of the near field communication unit 113 with the IC tag 200.

The sensor unit 115 is a sensor that detects various kinds of information. The sensor configuring the sensor unit 115 may be, for example, a position sensor 26 that acquires a current position or a temperature sensor that acquires a current temperature. When the sensor unit 115 detects various kinds of information, the control unit 114 can use the information detected by the sensor unit 115 as additional information when the portable terminal 100 is held over the IC tag 200.

The telephoning unit 116 is configured by, for example, a speaker or a microphone and executes telephoning by voice with another mobile phone or a telephone. The memory 117 is configured by, for example, a read-only memory (ROM) or a random access memory (RAM) and is used to store a program for controlling the operation of the portable terminal 100. A partial region of the memory 117 can function as, for example, the eSE 105 illustrated in FIG. 2. The manipulation unit 118 is configured by a button for manipulating the portable terminal 100. The operation of the portable terminal 100 is controlled by the control unit 114 according to a manipulation of the manipulation unit 118. When a touch panel is installed in the display unit 112, the touch panel also functions as the manipulation unit 118.

The configuration in which the telephoning unit 116 is included in the portable terminal 100 is illustrated in FIG. 4, but an embodiment of the present disclosure is not limited to the relevant examples. That is, when the telephoning function is not necessary in the portable terminal 100, the telephoning unit 116 may be excluded from the configuration of the portable terminal 100.

The functional configuration example of the portable terminal 100 according to the embodiment of the present disclosure has been described above with reference to FIG. 4. The portable terminal 100 according to the embodiment of the present disclosure has the configuration described in FIG. 4 so that the portable terminal 100 can execute the near field communication with the IC tag 200 to transmit information acquired from the IC tag 200 to the tag authentication server 11, the user management server 12, and the content server 13. The portable terminal 100 according to the embodiment of the present disclosure can use the digital content corresponding to the IC tag 200 based on information with which the tag authentication server 11 and the user management server 12 reply. The functional configuration example of the portable terminal 100 according to the embodiment of the present disclosure is illustrated in FIG. 4, but the IC tag 200 is assumed to have the same configuration as that illustrated in FIG. 4.

The specific functional configuration example of the portable terminal 100 according to the embodiment of the present disclosure has been described above with reference to FIG. 4. Next, an operation example of the information processing system 1 according to the embodiment of the present disclosure will be described.

[1.3 System Operation Example]

Figure 5:
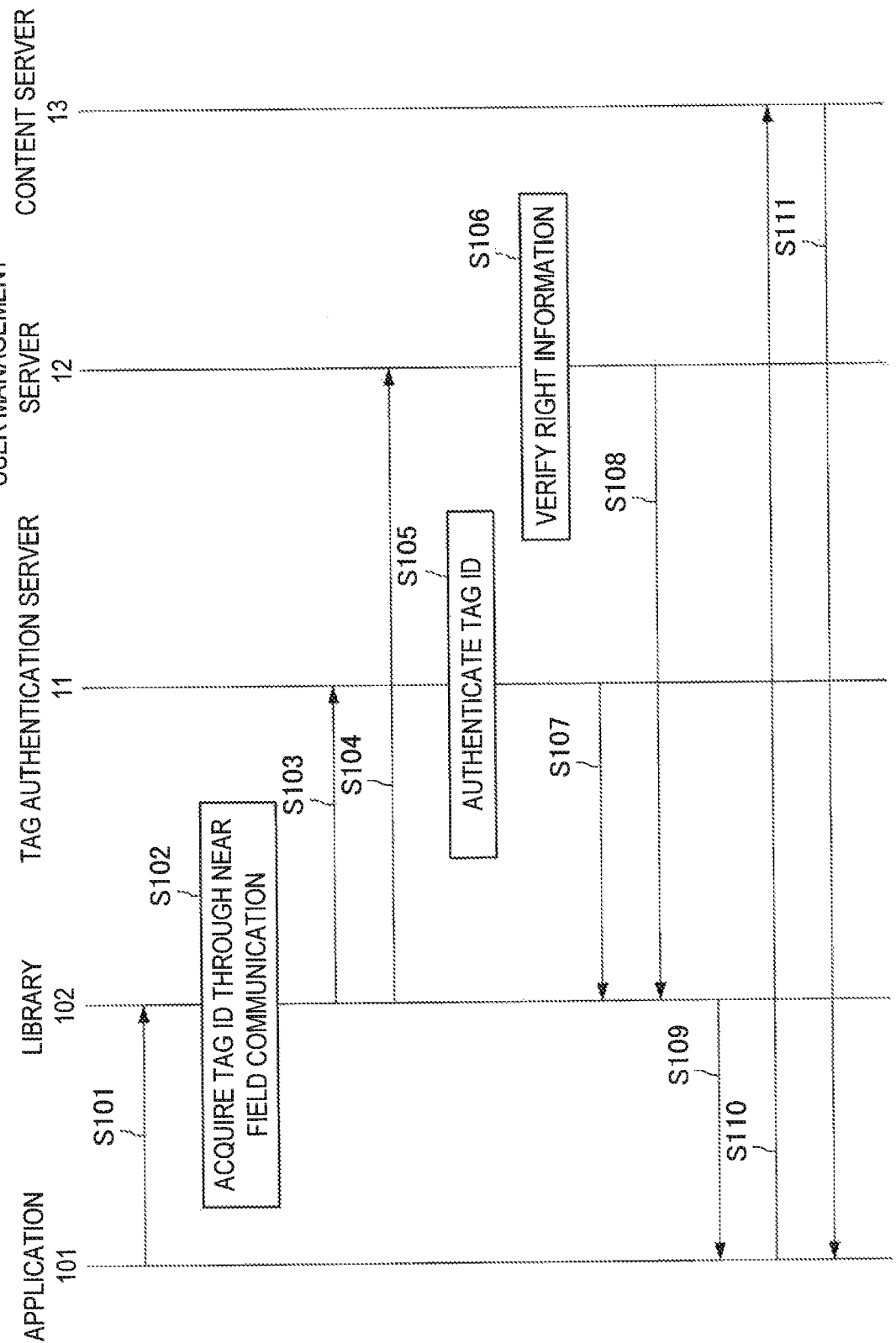
FIG. 5 is a flowchart showing an operation example of an information processing system according to an embodiment of the present disclosure.

FIG. 5 is a flowchart showing an operation example of the information processing system 1 according to the embodiment of the present disclosure. FIG. 5 illustrates an operation example of the information processing system 1 according to the embodiment of the present disclosure when the portable terminal 100 is held over the IC tag 200. Hereinafter, the operation example of the information processing system 1 according to the embodiment of the present disclosure will be described with reference to FIG. 5.

When the user manipulates the portable terminal 100 to acquire the digital content from the content server 13 and activates the application 101 for the purpose of outputting the acquired digital content and the user selects the acquisition of the digital content, the application 101 calls the library 102 and makes a request to return information regarding whether the IC tag 200 to be held can be used (step S101). When the user activates the application 101, the user may be allowed to input a user ID and a password of a service providing digital content in order to acquire the digital content from the content server 13. After the user activates the application 101 once and inputs the user ID and the password, the application 101 may store the user ID and the password.

Of course, when the user manipulates the portable terminal 100 and attempts to acquire the digital content from the content server 13, it is assumed that a user is registered in advance for the service provided by the content server 13 and issuing of the user ID and the password to the user is completed.

Figure 6:
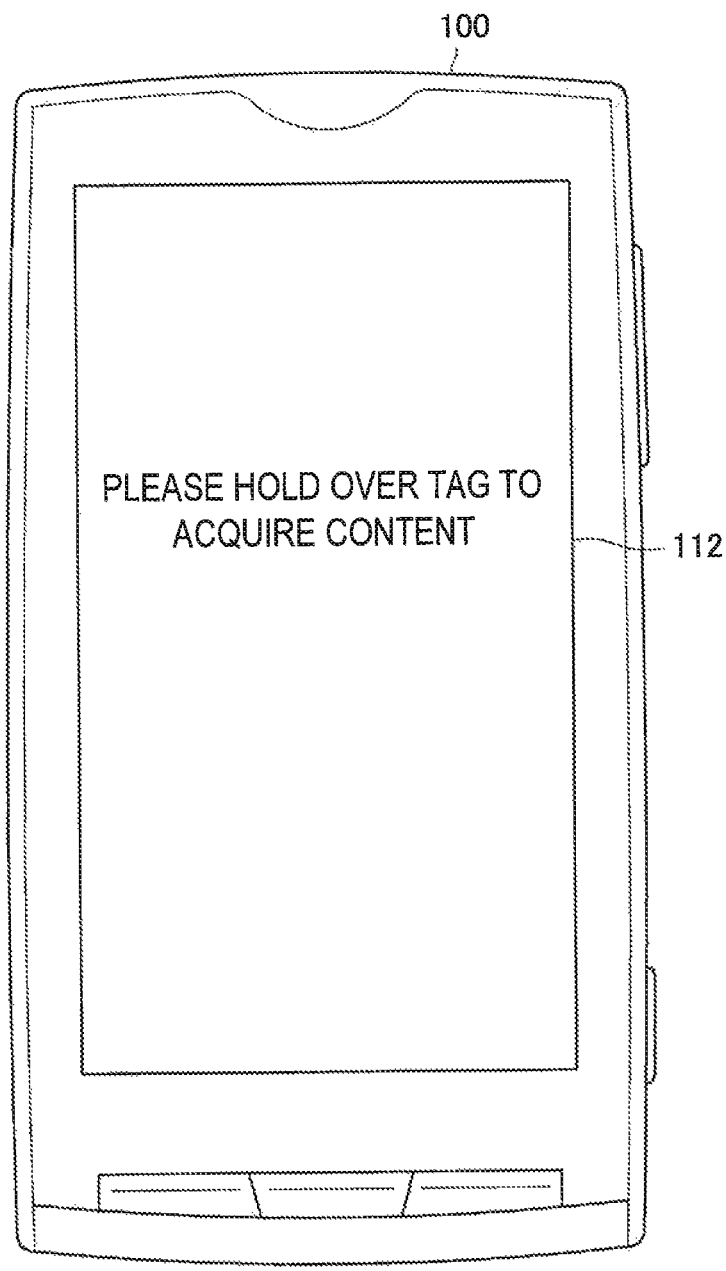
FIG. 6 is an illustrative diagram showing an example of a screen output to a display unit by the portable terminal according to an embodiment of the present disclosure.

FIG. 6 is an illustrative diagram showing an example of a screen output to the display unit 112 by the portable terminal 100 according to an embodiment of the present disclosure. FIG. 6 illustrates an example of the screen output by the display unit 112 when the user manipulates the portable terminal 100 and activates the application 101 and the user selects the acquisition of the digital content. When the user manipulates the portable terminal 100 and outputs the screen illustrated in FIG. 6 to the display unit 112, the portable terminal 100 emits radio waves from the near field communication unit 113 to enter a state in which the near field communication with the IC tag 200 is possible.

The library 102 called from the application 101 causes the CLF 104 to first acquire the tag ID from the IC tag 200 via the middleware 103 through the near field communication and to acquire the device ID from the eSE 105 (step S102). The near field communication instruction unit 121 can send an instruction to cause the CLF 104 to acquire the tag ID from the IC tag 200 through the near field communication. The device-unique information acquisition instruction unit 122 can send an instruction to acquire the device ID from the eSE 105. The CLF 104 caused to acquire the tag ID and the device ID from the middleware 103 acquires the tag ID from the IC tag 200 through the near field communication with the IC chip 210 of the IC tag 200, acquires the device ID from the eSE 105, and delivers the tag ID and the device ID to the library 102 via the middleware 103.

The library 102 acquiring the tag ID and the device ID from the CLF 104 transmits the tag ID and the device ID to the tag authentication server 11 (step S103). The library 102 transmits the acquired tag ID and device ID along with the user ID of the service providing the digital content to the user management server 12 (step S104). The transmission processes of steps S103 and S104 can be executed by the transmission unit 123. The library 102 may further transmit information specifying the portable terminal 100, e.g., a model name, to the user management server 12 in the foregoing step S104. In the execution order of the transmission process of step S103 and the transmission process of step S104, any transmission process may be executed first or the transmission processes may be executed at the same timing.

The tag authentication server 11 receiving the tag ID and the device ID from the library 102 of the portable terminal 100 executes an authentication process of the tag ID sent from the portable terminal 100 based on information managed by the tag authentication server 11 (step S105). As the authentication process of the tag ID, the tag authentication server 11 executes authentication regarding whether the tag ID is issued legitimately, verification regarding whether the portable terminal is in the state in which the tag ID can be used (for example, whether a period is valid), verification regarding the number of times the tag ID is transmitted, or the like. Based on information managed by the user management server 12, the user management server 12 receiving the tag ID and the device ID from the library 102 of the portable terminal 100 executes a verification process of whether the portable terminal 100 has the right information on the right to use the tag ID (step S106).

When the tag authentication server 11 executes the authentication process of the tag ID sent from the portable terminal 100 in the foregoing step S105, the result of the authentication process is returned to the portable terminal 100 (step S107). When the user management server 12 executes the verification process of the right information in the foregoing step S106, the result of the verification process of the right information is returned to the portable terminal 100 (step S108). Responses of steps S107 and S108 can be received by the reception unit 124.

Based on the results returned from the tag authentication server 11 and the user management server 12, the library 102 returns a fact indicating whether the portable terminal 100 is in the state in which the IC tag 200 can be used, to the application 101 (step S109). The process of step S109 can be executed by the information output unit 125. That is, when the tag authentication server 11 authenticates the tag ID and the portable terminal 100 has the right information on the right to use the IC tag 200, the library 102 outputs the fact that the portable terminal 100 is in the state in which the IC tag 200 can be used to the application 101. Conversely, when the tag authentication server 11 does not authenticate the tag ID and/or the portable terminal 100 does not have the right information on the right to use the IC tag 200, the library 102 outputs the fact that the portable terminal 100 is in a state in which the IC tag 200 may not be used to the application 101.

When the application 101 receives the output from the library 102, the application 101 can determine whether the digital content associated with the tag ID of the IC tag 200 can be output. When the library 102 outputs the fact that the portable terminal 100 is in the state in which the IC tag 200 can be used to the application 101 in the foregoing step S109, the application 101 gives a request for providing the digital content associated with the tag ID of the IC tag 200 to the content server 13 as a process related to the tag ID of the IC tag 200 (step S110). Accordingly, the digital content is preferably constructed to be acquired from the content server 13 only when the application 101 is aware of the location of the content server 13 in advance and the library 102 outputs the fact that the portable terminal 100 is in the state in which the IC tag 200 can be used to the application 101 in the foregoing step S109.

When the application 101 gives a request for providing the digital content associated with the tag ID of the IC tag 200 to the content server 13 in the foregoing step S110, the content server 13 provides the digital content to the application 101 according to the request (step S11). The digital content provided from the content server 13 may have a download format or a streaming format.

Figure 7:
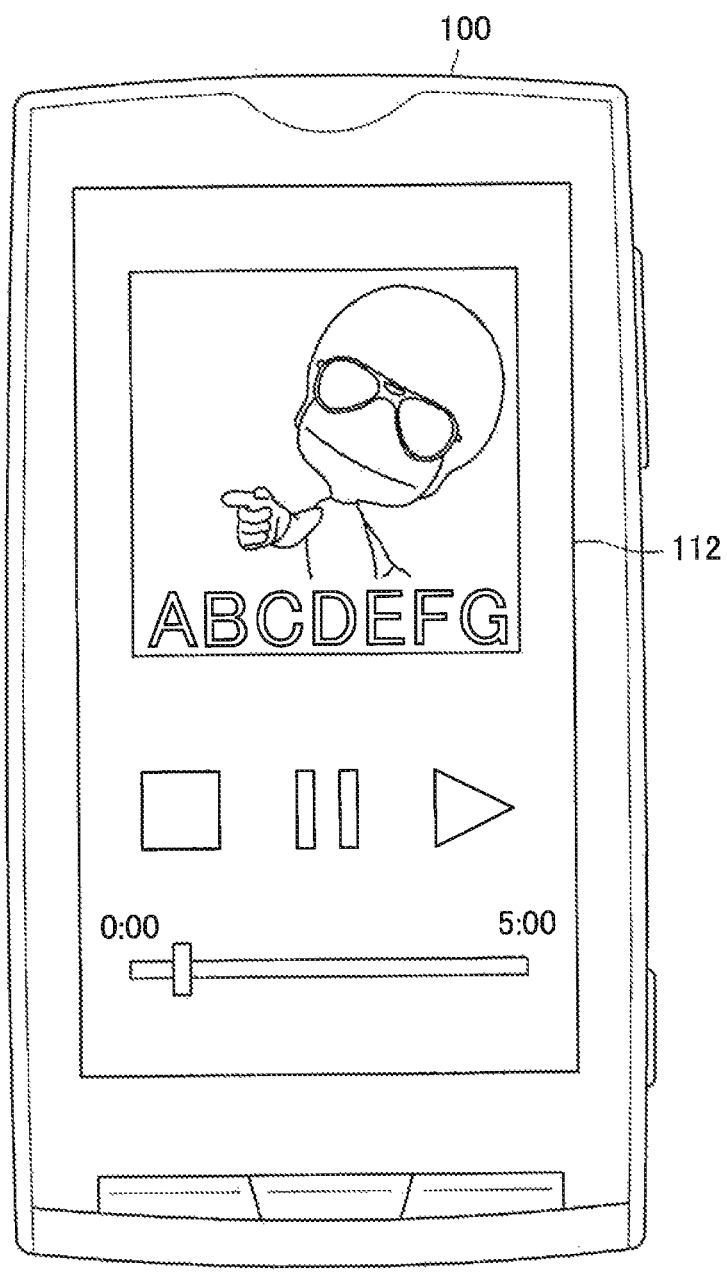
FIG. 7 is an illustrative diagram showing an example of a screen output to the display unit by the portable terminal according to an embodiment of the present disclosure.

FIG. 7 is an illustrative diagram showing an example of a screen output to the display unit 112 by the portable terminal 100 according to an embodiment of the present disclosure. FIG. 7 illustrates an example of a state in which the portable terminal 100 is provided with the digital content by the content server 13 and outputs the provided digital content to the display unit 112.

The digital content acquired once from the content server 13 by the portable terminal 100 may be able to be output to the portable terminal 100 several times thereafter even when the portable terminal 100 is not held over the IC tag 200 or data of the digital content may be set not to be output to the portable terminal 100 despite the fact that the data of the digital content is present in the portable terminal 100 when the portable terminal 100 is not held over the IC tag 200.

The information processing system 1 according to the embodiment of the present disclosure can prevent the digital content corresponding to the IC tag 200 and supplied by the content server 13 from being used without limit by executing the series of processes described above. The information processing system 1 according to the embodiment of the present disclosure can cause the portable terminal 100 to output the digital content corresponding to the IC tag 200 by executing the series of processes described above only when the IC tag 200 legitimately issues the tag ID and the portable terminal 100 held over the IC tag 200 has a right to output the digital content corresponding to the IC tag 200. The information processing system 1 according to the embodiment of the present disclosure can impose a restriction that the digital content corresponding to the IC tag 200 not be output to the portable terminal 100 when the IC tag 200 legitimately issues the tag ID but the portable terminal 100 held over the IC tag 200 has no right to output the digital content corresponding to the IC tag 200.

A service provider providing the digital content can voluntarily set a parameter regarding the maximum number of portable terminals 100 to which the digital content is permitted to be output in regard to the same IC tag 200 or a parameter regarding the maximum number of times that the digital content is permitted to be output to the same portable terminal 100 when the portable terminal 100 is held over the same IC tag 200. For example, for simplicity, a case in which the digital content is set to be permitted to be output to only one portable terminal 100 in regard to the same IC tag 200 will be considered. When the right information is granted to the portable terminal 100a in the system configuration example of FIG. 1, the right information is not present in the portable terminal 100b despite the fact that the portable terminal 100b is held over the IC tag 200. Therefore, the user management server 12 sends a response indicating that the portable terminal 100b does not have the right information.

However, it may not yet be necessary for the portable terminal 100a to acquire the digital content using the IC tag 200. For example, a case in which the user does not yet own the portable terminal 100a because of so-called model change or the user does not use the portable terminal 100a can be considered. When the digital content corresponding to the IC tag 200 is output to the portable terminal 100a of a friend, a case in which the right information of the IC tag 200 is desired to be deleted from the portable terminal 100a of the friend can be also considered.

Accordingly, in the above-described example, the portable terminal 100b may be set to select the portable terminal 100a from which the right information of the IC tag 200 is deleted. Hereinafter, an operation example of the information processing system 1 in which the right information of a certain IC tag 200 is deleted when the number of portable terminals 100 having the right information of the certain IC tag 200 reaches an upper limit will be described.

Figure 8:
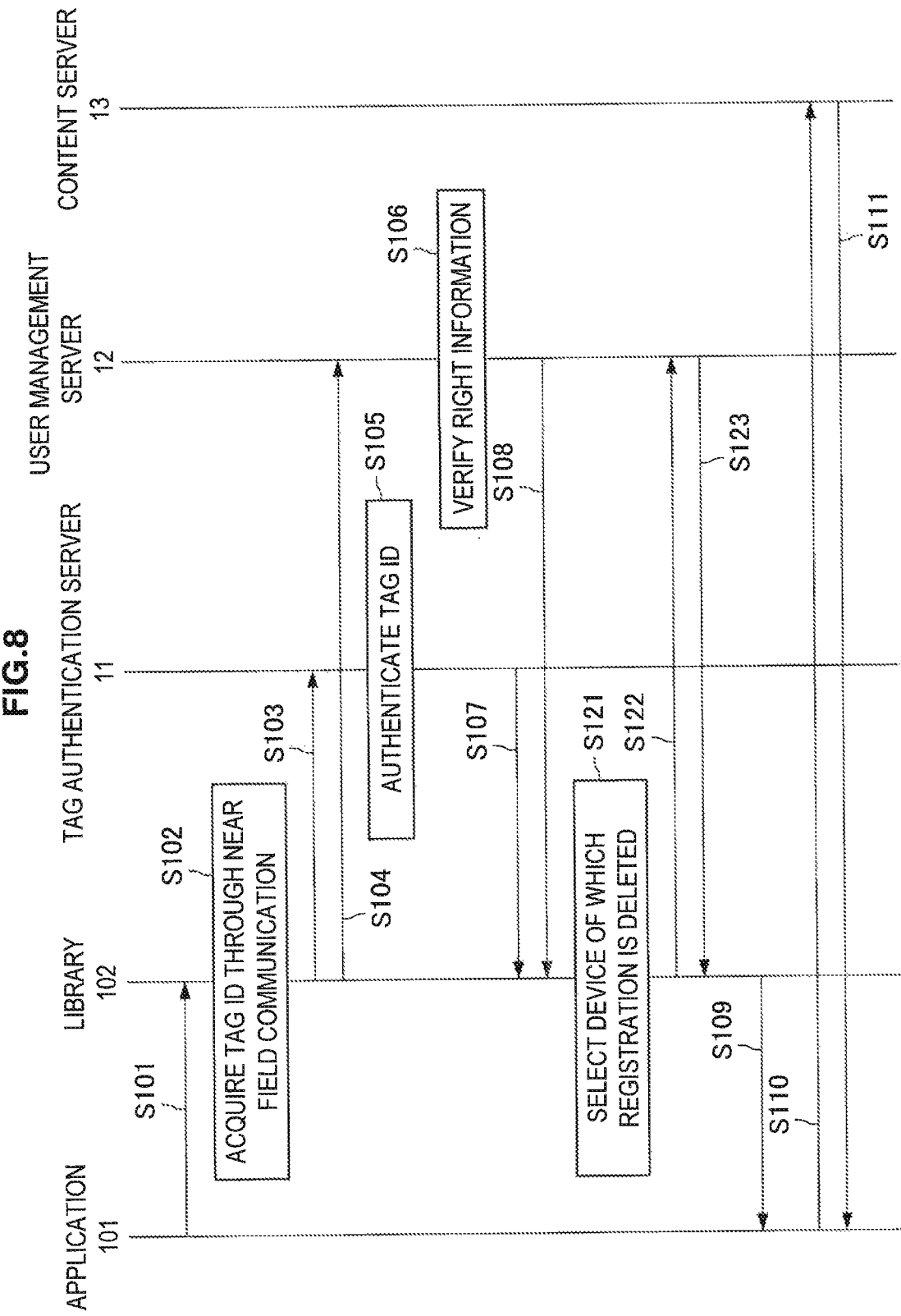
FIG. 8 is a flowchart showing an operation example of the information processing system according to an embodiment of the present disclosure.

FIG. 8 is a flowchart showing an operation example of the information processing system 1 according to the embodiment of the present disclosure. FIG. 8 illustrates the operation example of the information processing system 1 when the portable terminal 100 is held over the IC tag 200. Hereinafter, the operation example of the information processing system 1 according to the embodiment of the present disclosure will be described with reference to FIG. 8.

Steps S101 to S108 of FIG. 8 are the same as those of the operation example of the information processing system 1 according to the embodiment of the present disclosure illustrated in FIG. 5. That is, when the portable terminal 100 executes the application 101 and the portable terminal 100 is held over the IC tag 200, the near field communication is executed between the portable terminal 100 and the IC tag 200 and communication is executed between the library 102, and the tag authentication server 11 and the user management server 12.

Here, as the result of the communication between the library 102, and the tag authentication server 11 and the user management server 12, it is assumed that the number of portable terminals 100 held over the IC tag 200 has already reached the upper limit and the fact that the portable terminal 100 does not have the right information of the IC tag 200 is sent from the user management server 12 to the portable terminal 100. The library 102 of the portable terminal 100 may acquire information on another portable terminal 100 having the right information of the IC tag 200 from the user management server 12 and output a screen used to select the portable terminal 100 from which the right information of the IC tag 200 is deleted.

Figure 9:
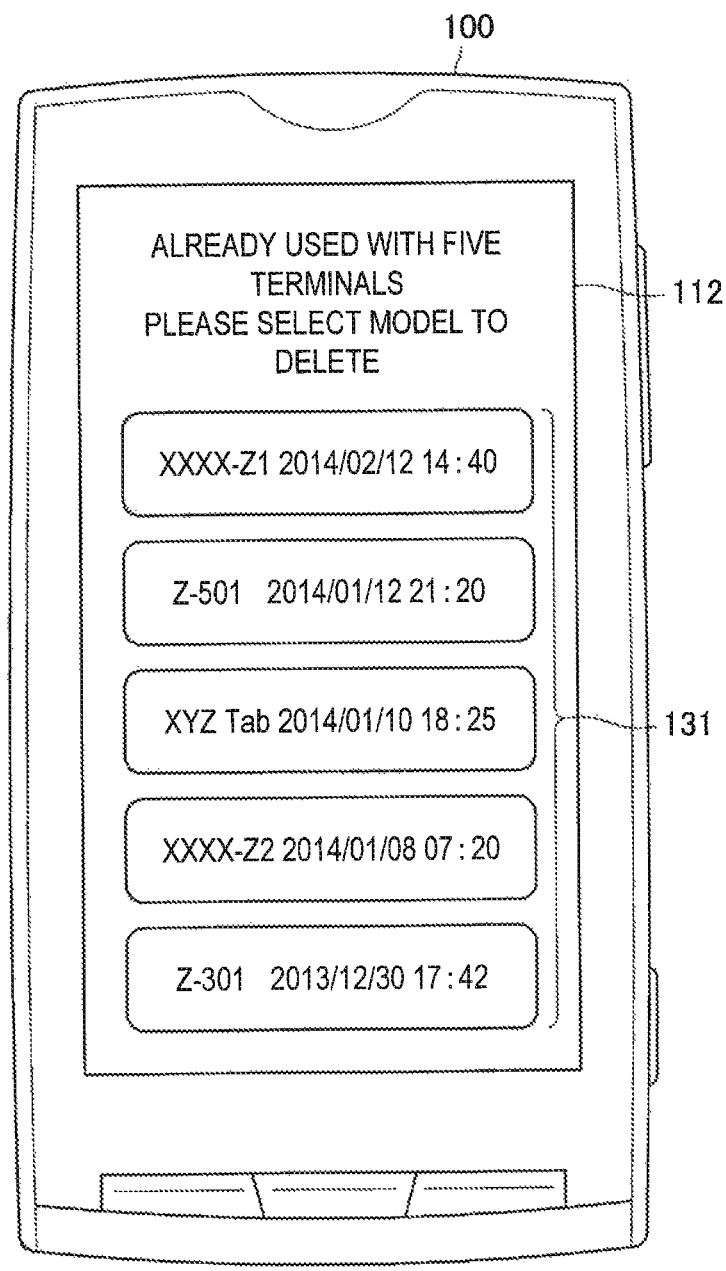
FIG. 9 is an illustrative diagram showing an example of a screen output to the display unit by the portable terminal according to an embodiment of the present disclosure.

FIG. 9 is an illustrative diagram showing an example of a screen output to the display unit 112 by the library 102 of the portable terminal 100 according to an embodiment of the present disclosure. FIG. 9 illustrates the example of the screen on which a list of the other portable terminals 100 having the right information of the IC tag 200 is displayed and the screen on which the user selects the portable terminal 100 from which the right information of the IC tag 200 is deleted from five portable terminals 100 having the right information of the IC tag 200. The screen illustrated in FIG. 9 can be output by, for example, the information output unit 125. Reference numeral 131 denotes a list that is acquired from the user management server 12 and is the list of the portable terminals 100 having the right information of the IC tag 200. Information on the five portable terminals 100 is illustrated in FIG. 9. The user can touch the inside of one frame with his or her finger or the like among five frames indicated by reference numeral 131 to select the portable terminal 100 from which the right information of the IC tag 200 is deleted. In FIG. 9, model names of the portable terminals 100 having the right information of the IC tag 200 and times at which the digital content was most recently output using the IC tag 200 are displayed. When the portable terminal 100 from which the right information of the IC tag 200 is deleted is selected based on a user's manipulation (step S121), the library 102 transmits a request to delete the right information of the IC tag 200 to the selected portable terminal 100 and transmits a request to grant the right information of the IC tag 200 to the self-portable terminal to the user management server 12 (step S122). The user management server 12 receiving the request from the portable terminal 100 deletes the right information of the IC tag 200 from the selected portable terminal 100, grants the right information of the IC tag 200 to the portable terminal 100 transmitting the request to grant the right information of the IC tag 200, and responds to the portable terminal 100 to indicate that the portable terminal 100 has the right information of the IC tag 200 (step S123).

Based on results returned from the tag authentication server 11 and the user management server 12, the library 102 returns the fact that the portable terminal 100 is in the state in which the IC tag 200 can be used to the application 101 (step S109). As in steps S110 and S111 of the operation example illustrated in FIG. 5, the application 101 acquires the digital content corresponding to the IC tag 200 from the content server 13 and outputs the acquired digital content.

The information processing system 1 according to the embodiment of the present disclosure can select the portable terminal 100 from which the right information of the IC tag 200 is deleted among the portable terminals 100 having the right information of the IC tag 200 by executing the series of processes described above even when the number of portable terminals 100 having the right information of the IC tag 200 reaches the upper limit. The information processing system 1 according to the embodiment of the present disclosure can grant the right information of the IC tag 200 to another portable terminal 100 and provide the digital content corresponding to the IC tag 200 to the portable terminal 100 to which the right information is granted. Such switching of the portable terminal 100 having the right information is effective, for example, when the content server 13 delivers the digital content in a streaming format, that is, when a value does not remain in the portable terminal 100.

In the above-described example, the example of the screen on which the portable terminal 100 held over the IC tag 200 does not have the right information of the IC tag 200 and the list of the other portable terminals 100 having the right information of the IC of the IC tag 200 is displayed has been described with reference to FIG. 9. However, the portable terminal 100 held over the IC tag 200 has the right information of the IC tag 200 and the portable terminal 100 may further display a list of the portable terminals 100 having the right information of the IC tag 200 in addition of the self-terminal on the list screen illustrated in FIG. 9. When the self-terminal is selected on the list screen of the terminals, the right information of the IC tag 200 is deleted from the self-terminal, and thus the digital content corresponding to the IC tag 200 may not be output.

Another operation example of the information processing system 1 according to the embodiment of the present disclosure will be described. In a case in which it is not necessary for the portable terminal 100 to output the digital content corresponding to the IC tag 200 and the portable terminal 100 is held over the IC tag 200, when the right information of the IC tag 200 can be configured to be deleted with the portable terminal 100, convenience for the user is improved. Hereinafter, an operation example in which the right information of the IC tag 200 is deleted when the portable terminal 100 is held over the IC tag 200 will be described.

FIG. 10 is a flowchart showing an operation example of the information processing system 1 according to an embodiment of the present disclosure. FIG. 10 illustrates the operation example of the information processing system 1 when the portable terminal 100 is held over the IC tag 200. Hereinafter, the operation example of the information processing system 1 according to the embodiment of the present disclosure will be described with reference to FIG. 10.

Steps S101 to S108 of FIG. 10 are the same as those of the operation example of the information processing system 1 according to the embodiment of the present disclosure illustrated in FIG. 5. That is, when the portable terminal 100 executes the application 101 and the portable terminal 100 is held over the IC tag 200, the near field communication is executed between the portable terminal 100 and the IC tag 200 and communication is executed between the library 102, and the tag authentication server 11 and the user management server 12.

When the portable terminal 100 has the right information of the IC tag 200 as the result of the communication between the library 102, and the tag authentication server 11 and the user management server 12 but the right information is desired to be deleted, the portable terminal 100 does not acquire and output the digital content but outputs a screen for deleting the right information of the IC tag 200.

FIG. 11 is an illustrative diagram showing an example of a screen output to the display unit 112 by the library 102 of the portable terminal 100 according to the embodiment of the present disclosure. FIG. 11 illustrates the example of the screen output to the display unit 112 of the portable terminal 100 in order to delete the right information of the IC tag 200 which the self-terminal has. A button 141 is a button for giving a request to delete the right information of the IC tag 200 which the self-terminal has to the user management server 12. On the other hand, a button 142 is a button for transitioning to, for example, the output screen of the digital content illustrated in FIG. 7 without deleting the right information of the IC tag 200 which the self-terminal has.

When the user selects the button 141, the library 102 gives the user management server 12 a request to delete the right information of the IC tag 200 which the self-terminal has (step S131). The user management server 12 deletes the right information of the IC tag 200 for the portable terminal 100 and responds to the portable terminal 100 to indicate that the right information of the IC tag 200 is deleted (step S132). When the right information of the IC tag 200 is deleted from the user management server 12, the portable terminal 100 may not output the digital content corresponding to the IC tag 200.

The operation example of the information processing system 1 according to the embodiment of the present disclosure has been described above with reference to the drawings. The information processing system 1 according to the embodiment of the present disclosure executes the series of processes described above to delete the right information of the IC tag 200 which the portable terminal 100 has when the portable terminal 100 is held over the IC tag 200. By executing the process of deleting the right information of the IC tag 200 when the portable terminal 100 is held over the IC tag 200, it is possible to easily determine which IC tag 200 is selected to delete the right information of the IC tag 200 when the user owns the plurality of IC tags 200. Thus, the deletion of the right information from the portable terminal 100 having the right information is effective, for example, when the content server 13 delivers the digital content in a download format, that is, when a value remains in the portable terminal 100.

[1.4 Other Modification Examples]

Finally, modification examples of the embodiments of the present disclosure will be mentioned. In the above-described examples, the case in which the portable terminal 100 includes the CLF 104 that performs the near field communication and the eSE 105 that is the secure region has been described, but the configuration of the portable terminal 100 is not limited to the relevant examples in an embodiment of the present disclosure. For example, in replacement of the eSE 105 included in the portable terminal 100, the device ID may be stored in a universal integrated circuit card (UICC) or an SD card which can be removed from the portable terminal 100 or the device ID may be stored in a secure execution environment in an application processor having the secure execution environment (Trusted Environment Execution: TEE). The application processor may be integrated with the CLF.

<2. Conclusion>

According to the embodiments of the present disclosure described above, there is provided the portable terminal 100 executing the library 102 that is called from the application 101 outputting the digital content corresponding to the IC tag 200 and makes the request to authenticate the IC tag 200 and verify the right information of the IC tag 200 when the portable terminal 100 is held over the IC tag 200.

The portable terminal 100 according to the embodiments of the present disclosure can execute the near field communication with the IC tag 200 and transmit the information acquired from the IC tag 200 to the tag authentication server 11, the user management server 12, and the content server 13. The portable terminal 100 according to the embodiments of the present disclosure can use the digital content corresponding to the IC tag 200 based on the information with which the tag authentication server 11 and the user management server 12 respond.

Steps in processes executed by devices in this specification are not necessarily executed chronologically in the order described in a sequence chart or a flow chart. For example, steps in processes executed by devices may be executed in a different order from the order described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, by configuring respective functional blocks shown in a functional block diagram as hardware, the hardware can achieve a series of processes.

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) An information processing method of an information processing device, including:

acquiring tag-unique information unique to an IC tag from the IC tag through near field communication;

acquiring device-unique information unique to the information processing device;

transmitting the acquired tag-unique information and the acquired device-unique information to an outside; and receiving, from the outside, an authentication result of the acquired tag-unique information and a verification result of right information for using the IC tag, which are obtained based on the transmitted tag-unique information and device-unique information.

(2) The information processing method of an information processing device according to (1), further including:

suggesting information on a device having the right information in regard to the IC tag from which the tag-unique information is acquired.

(3) The information processing method of an information processing device according to (2), further including:

suggesting information on devices actually having the right information of the IC tag when a number of devices already having the right information in regard to the IC tag from which the tag-unique information is acquired is known to have reached an upper limit according to the received verification result of the right information.

(4) The information processing method of an information processing device according to (3), further including:

transmitting, when the device is selected in the suggested information on the devices having a right to use the IC tag, a request to delete the right information in regard to the device.

(5) The information processing method of an information processing device according to (1), further including:

transmitting a request to delete the right information granted to the information processing device after acquiring the tag-unique information unique to the IC tag from the IC tag through the near field communication.

(6) The information processing method of an information processing device according to any one of (1) to (5), further including:

executing a process related to the acquired tag-unique information based on the authentication result of the acquired tag-unique information and the verification result of the right information for using the IC tag.

(7) The information processing method of an information processing device according to any one of (1) to (6), wherein the acquired tag-unique information and the device-unique information are transmitted to a first server device and a second server device, respectively, and wherein the authentication result of the acquired tag-unique information is received from the first server device and the verification information of the right information for using the IC tag is received from the second server device.

(8) An information processing device including:

a near field communication instruction unit configured to acquire tag-unique information unique to an IC tag from the IC tag through near field communication;

a device-unique information acquisition instruction unit configured to acquire device-unique information unique to the information processing device;

a transmission unit configured to transmit the acquired tag-unique information and the acquired device-unique information to an outside; and a reception unit configured to receive, from the outside, an authentication result of the acquired tag-unique information and a verification result of right information for using the IC tag, which are obtained based on the tag-unique information and the device-unique information.

(9) The information processing device according to (8), further including:

a process execution unit configured to execute a process related to the verification result of the right information and the tag-unique information on the received authentication result of the tag-unique information.

(10) The information processing device according to (9), wherein the process execution unit executes a process of reproducing content associated with the tag-unique information as a process related to the tag-unique information.

(11) The information processing device according to (8) or (9), further including:

an information output unit configured to suggest information on a device having the right information in regard to the IC tag from which the tag-unique information is acquired.

(12) The information processing device according to (11), wherein, when the number of devices already having the right information in regard to the IC tag from which the tag-unique information is acquired is known to reach an upper limit according to the verification result of the right information received by the reception unit, the information output unit suggests information on the devices actually having the right information of the IC tag.

(13) An authentication server device that authenticates tag-unique information in a system in which the tag-unique information unique to an IC tag and device-unique information unique to an information processing device are acquired from the information processing device, an authentication result of the tag-unique information and a verification result of right information for using the IC tag are transmitted to the information processing device, and the information processing device executes a process related to the tag-unique information based on the authentication result and the verification result, the authentication server device including:

a communication unit configured to communicate with the information processing device; and an authentication processing unit configured to receive the tag-unique information from the information processing device via the communication unit, to execute an authentication process based on the tag-unique information, and to transmit the authentication result of the tag-unique information to the information processing device.

(14) A verification server device that verifies right information in a system in which tag-unique information unique to an IC tag and device-unique information unique to an information processing device are acquired from the information processing device, an authentication result of the tag-unique information and a verification result of the right information for using the IC tag are transmitted to the information processing device, and the information processing device executes a process related to the tag-unique information based on the authentication result and the verification result, the verification server device including:

a communication unit configured to communicate with the information processing device; and a verification processing unit configured to receive the tag-unique information and the device-unique information from the information processing device via the communication unit, to perform a verification process for the right information based on the tag-unique information and the device-unique information, and to transmit the verification result of the right information to the information processing device.

What is claimed is:

1. An information processing method of an information processing device, comprising:
    acquiring tag-unique information from an IC tag through near field communication, wherein the tag-unique information is unique to the IC tag;
    acquiring device-unique information unique to the information processing device;
    transmitting the acquired tag-unique information and the acquired device-unique information to an outside device;
    receiving, from the outside device, an authentication result of the acquired tag-unique information for authenticating legitimacy of the IC tag and a verification result of right information for using the IC tag, which are obtained based on the transmitted tag-unique information and device-unique information, and
    suggesting information on an applicable device having the right information in regard to the IC tag from which the tag-unique information is acquired.

2. The information processing method of the information processing device according to claim 1, further comprising:
    suggesting information on devices actually having the right information of the IC tag when a number of devices already having the right information in regard to the IC tag from which the tag-unique information is acquired is known to have reached an upper limit according to the received verification result of the right information.

3. The information processing method of the information processing device according to claim 2, further comprising:
    transmitting, when the device is selected in the suggested information on the devices having a right to use the IC tag, a request to delete the right information in regard to the device.

4. The information processing method of the information processing device according to claim 1, further comprising:
    transmitting a request to delete the right information granted to the information processing device after acquiring the tag-unique information unique to the IC tag from the IC tag through the near field communication.

5. The information processing method of the information processing device according to claim 1, further comprising:
    executing a process related to the acquired tag-unique information based on the authentication result of the acquired tag-unique information and the verification result of the right information for using the IC tag.

6. The information processing method of the information processing device according to claim 1,
    wherein the acquired tag-unique information and the device-unique information are transmitted to a first server and a second server, respectively,
    wherein the authentication result of the acquired tag-unique information is received from the first server and the verification information of the right information for using the IC tag is received from the second server, and
    wherein the first server is different from the second server.

7. The information processing method of the information processing device according to claim 1, wherein the tag-unique information includes a parameter regarding a maximum number of devices permitted using the IC tag.

8. The information processing method of the information processing device according to claim 1, wherein the tag-unique information includes a parameter regarding a maximum number of times a content is permitted to be outputted.

9. The information processing method of the information processing device according to claim 1, wherein the device-unique information includes information of a time at which the information processing device was held over the IC tag.

10. The information processing method of the information processing device according to claim 1, wherein the applicable device is associated with both the authenticated tag-unique information and the verified right information.

11. An information processing device comprising:
    a near field communication instruction unit configured to acquire tag-unique information from an IC tag through near field communication, wherein the tag-unique information is unique to the IC tag;
    a device-unique information acquisition instruction unit configured to acquire device-unique information unique to the information processing device;
    a transmission unit configured to transmit the acquired tag-unique information and the acquired device-unique information to an outside device; and
    a reception unit configured to receive, from the outside device, an authentication result of the acquired tag-unique information for authenticating legitimacy of the IC tag and a verification result of right information for using the IC tag, which are obtained based on the tag-unique information and the device-unique information; and
    an information output unit configured to suggest information on an applicable device having the right information in regard to the IC tag from which the tag-unique information is acquired,
    wherein the near field communication instruction unit, the device-unique information acquisition instruction unit, the transmission unit, the reception unit and the information output unit are each implemented via at least one processor.

12. The information processing device according to claim 11, further comprising:
    a process execution unit configured to execute a process related to the verification result of the right information and the tag-unique information on the received authentication result of the tag-unique information,
    wherein the process execution unit is implemented via at least one processor.

13. The information processing device according to claim 12, wherein the process execution unit executes a process of reproducing content associated with the tag-unique information as a process related to the tag-unique information.

14. The information processing device according to claim 11, wherein, when a number of devices already having the right information in regard to the IC tag from which the tag-unique information is acquired is known to reach an upper limit according to the verification result of the right information received by the reception unit, the information output unit suggests information on the devices actually having the right information of the IC tag.

15. An authentication server comprising:
a communication unit configured to communicate with an information processing device; and
an authentication processing unit configured to
receive a tag-unique information unique to an IC tag, and device-unique information unique to the information processing device, from the information processing device via the communication unit,
execute an authentication process based on the received tag-unique information and the device-unique information, and
transmit an authentication result of the tag-unique information for authenticating legitimacy of the IC tag, and a verification result of right information for using the IC tag, to the information processing device for enabling execution of a process related to the tag-unique information and based on the authentication result and the verification result.

16. A verification server comprising:
a communication unit configured to communicate with an information processing device; and
a verification processing unit configured to
receive a tag-unique information unique to an IC tag and a device-unique information unique to the information processing device from the information processing device via the communication unit,
perform a verification process that verifies right information for using the IC tag based on the tag-unique information and the device-unique information, and
transmit a verification result of the right information and an authentication result of the tag-unique information to the information processing device for enabling execution of a process related to the tag-unique information based on the authentication result and the verification result.

* * * * *